United States Patent

Polestak

[15] 3,668,060

[45] June 6, 1972

[54] FILAMENTS AND FILMS OF POLYMERS OF ALKYLENE SULFIDES

[72] Inventor: Walter J. Polestak, Summit, N.J.
[73] Assignee: Celanese Corporation, New York, N.Y.
[22] Filed: Apr. 10, 1970
[21] Appl. No.: 31,447

Related U.S. Application Data

[62] Division of Ser. No. 575,722, Aug. 29, 1966, Pat. No. 3,539,676.

[52] U.S. Cl............................161/173, 161/178, 260/2.5 E, 260/79.7
[51] Int. Cl......................................D01d 5/22, B29d 27/00
[58] Field of Search.................161/172, 173, 178; 260/79.7, 260/2.5 E

[56] References Cited

UNITED STATES PATENTS 3,365,431  1/1968  Gobran et al.........................260/79.7

OTHER PUBLICATIONS

Chemical Abstracts, 57:3621f (1962)

Primary Examiner—Robert F. Burnett
Assistant Examiner—Raymond O. Linker, Jr.
Attorney—D. J. De Witt and C. B. Barris

[57] ABSTRACT

Hard stretch filaments and films produced by extruding a heat softened or molten polymer of alkylene sulfide, such as polyethylene sulfide, having an inherent viscosity of about 0.5 or greater, through a shaping orifice to form the filament or film and taking up the product at a linear rate of from 20 to 3,000 meters per minute at a drawdown ratio of from 100:1 to 4000:1. A filament which spontaneously develops helical crimps along its length produced when a drawdown ratio greater than 1200:1 is used. Open-celled filaments or films produced from the hard stretch filaments and films by stretching the filaments or films in a range of from about 50 percent of the unstretched length up to about 90 percent of the breaking elongation and stabilized by heating the filament or film while in the stretched state to a temperature in the range from about 80°C. to a temperature below the melting point of the polymer.

8 Claims, 1 Drawing Figure

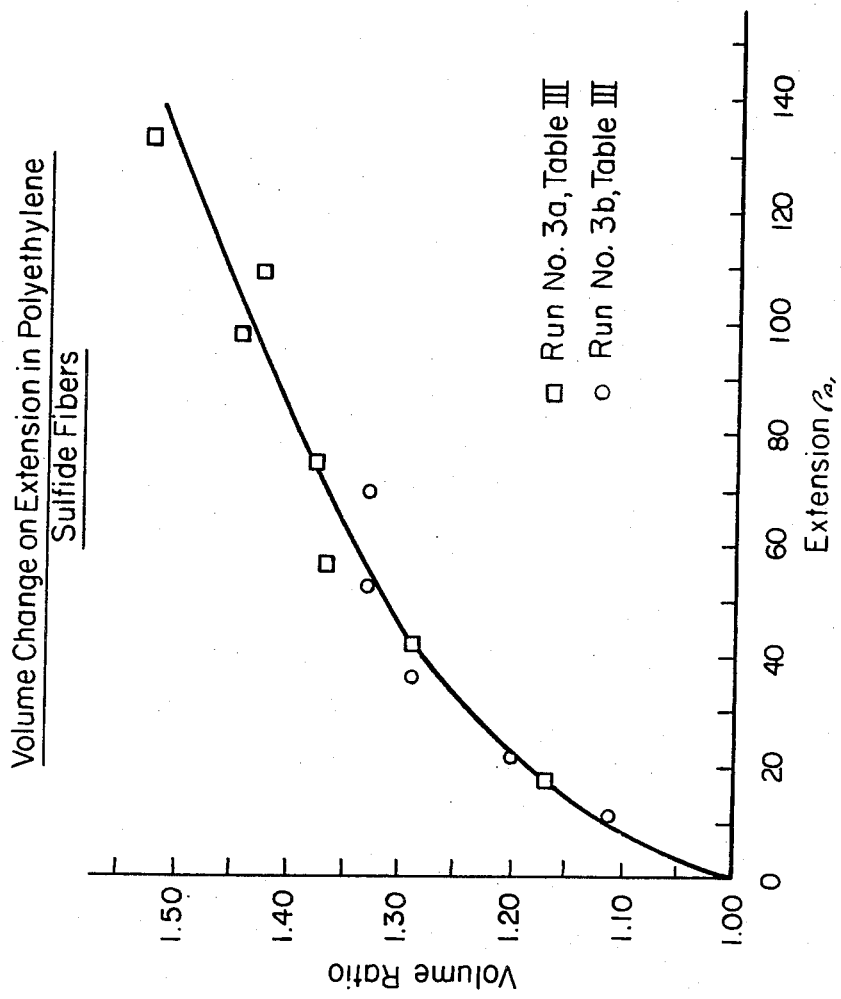

FILAMENTS AND FILMS OF POLYMERS OF ALKYLENE SULFIDES

This is a division of application Ser. No. 575,722, filed Aug. 29, 1966 now U.S. Pat. No. 3,539,676.

This invention relates to a preparation of filaments and films from polymers of alkylene sulfides, more particularly, this invention relates to the melt spinning of filaments and films exhibiting "hard stretch" characteristics from polyethylene sulfide.

As used herein, the term "hard stretch" signifies those product properties characterized by high elongations, low tenacities, relatively low modulus values, high tensile recoveries and significant yield stresses.

It has been proposed to prepare polymers of alkylene sulfides, e.g. polyethylene sulfide, into filaments and films by extrusion in heat-softened or molten form through suitably shaped orifices with cooling of the extruded material. The use of such polymers has, however, heretofore been restricted by difficulties encountered in successfully converting the polymers into the useful filaments and films.

According to the present invention, a heat-softened or molten polymer of alkylene sulfide having an inherent viscosity of about 0.5 or these is extruded through a shaping orifice to form a filament or film product which product is taken up on a bobbin or a roll at a linear rate of from about 20 meters per minute up to a rate of about 3,000 or more meters per minute. Preferably, the product is taken up at a linear rate considerably more than the aforesaid lower limit, e.g. at a rate within the range of from about 1,500 meters per minute up to about 2,500 meters per minute. It has been found that at these high take-up speeds the filaments or films obtained from the polymers of alkylene sulfides having relatively high inherent viscosities are of industrial utility.

As used herein, the term "inherent viscosity" is defined as:

$$\frac{\ln(n)_r}{c}$$

wherein $c$ is the concentration in grams of polymer in 100 ml. of the particular employed solvent and "$(n)_r$ is the relative viscosity which is the ratio of the flow times in a viscometer of polymer solution and of solvent at 120° C. The inherent viscosity is indicative of the molecular wight of the polymer.

The monomers from which the polymeric starting materials of the present invention are employed are alkylene sulfides which have the general formula:

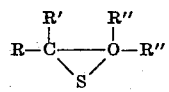

where R, R', R" and R" may be, for example, hydrogen, an aliphatic radical, a cycloaliphatic radical, an aryl radical, etc. The Rs may also be joined to form a cyclic structure. In cases where one or more of the Rs contain an epoxide group, a diepoxide or polyepoxide results, for the purposes of simplicity, this disclosure will consider only the materials with one epoxide group. This is not, however, to be considered as a limiting factor of the invention.

The alkylene sulfides will react under suitable conditions to build up polymer chains of considerable length. If desired, they may be reacted with other organic or inorganic molecules. Examples of material which can be made to react with the alkylene sulfides are well known in the art. The general formula for the resulting polymer of alkylene sulfide, exclusive of extraneous monomers, may be represented as follows:

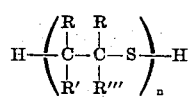

where R, R', R" and R'" are as described above and $n$ is number of monomer units in the chain. Thus, the polyalkylene sulfides suitable for use herein will comprise a predominance of the foregoing recurring units.

In accordance with the present invention, a relatively high molecular weight polyethylene sulfide having a high inherent viscosity i.e. an inherent viscosity of 0.5 and greater is a preferred fiber-forming material, This material which is solid and crystalline having a melting point of at least 200° C. and preferably between 208° and 212° C. may be prepared by polymerizing ethylene sulfide in a medium virtually devoid of elemental oxygen, and in the presence of a catalyst which is the product of the reaction of the zinc diethyl on water. The properties of a typical polyethylene sulfide material suitable for use in the present invention is given on the following Table I.

TABLE I

POLYETHYLENE SULFIDE

| Properties | Value | Test Method |
|---|---|---|
| Density | 1.340 g/cc | D-1505 |
| Crystallinity | 70–80% | - |
| Melting Point | 205°C. | D-648 |
| Tensile Strength | 10,500 psi | D-638 |
| Elongation | 10% | D-638 |
| Tensile Modulus | 320,000 psi | D-638 |
| Flexural Modulus | 300,000 psi | D-790 |
| Izod Impact | 1.53 ft.-lb./in. | D-256 |
| Tensile Impact | 77 ft.-lb./in. | D-1822 |
| Shear Strength | 7,800 psi | D-732 |
| Taber Abrasion | 7.3 mg. at 1,000 cycles | D-1242 |
| Hardness | M-85 | D-785 |
| Water Absorption | 0.033%(24 hrs. at 23°C.) | D-570 |

To carry out the process of the invention, a heat-softened or molten polymer is extruded through an orifice having at least one small dimension, e.g. of 0.05 to 5.0 mm. The process is particularly useful in the case of the melt spinning of filaments, e.g. wherein the dimensions of the orifice in all directions are within the foregoing range. In the case of the extrusion of polyethylene sulfides, the temperature of the polymer being extruded may be, for example, in the range of about 190° to 300° C. and preferably in the range of between 220° and 270° C. Of course, the above temperatures may be either raised or lowered according to heat stability of the polymer employed, as well as the conditions utilized, e.g. residence time, etc. While a minimum linear take-up speed of more than 20 meters per minute is used substantially higher take-up speeds are preferably employed, e.g. take-up speeds of 1,500 to 2,500 meters per minute or even higher, using a draw-down ratio in a range of, for example, 100 to 4,000.

The "drawdown" ratio or "spin draw" ratio is the ratio of the velocity of initial fiber take-up to the linear velocity of the extrusion of the molten polymer.

Filaments having deniers in the range of, for example, 1 to 15 are of greatest general interest but the invention may, if desired, be employed in making much heavier filaments of up to, for example, 100 denier as well as in making films in a broad range of thicknesses. The pressure exerted on the polymer to effect extrusion is usually several hundred pounds per square inch, for instance it may be from 500 to 5,000 psi or higher.

In general, the polymer may be extruded into the air at room temperature. However, it may, if desired, be extruded into an atmosphere of inert gas, e.g. nitrogen, argon, steam or carbon dioxide or into a liquid such as water, acetone or methylene chloride at a temperature low enough to set the extruded material. The gas on the downstream side of shaping orifice may be circulated for a better heat transfer.

One of the advantages issuing from the instant invention is that the filaments and films obtained from the process are commercially useful without applying a separate drawing operation, e.g. they may be suitably employed without being subjected to a cold or hot drawing step. Obviously, the deletion of this operation and the apparatus utilized therewith represents an advantage which inures to the commercial aspects of the invention.

The properties of the shaped article resulting from the process of the invention are especially attractive when there is incorporated in the polymer a thermal stabilizer which may be an antioxidant, as for example a phenolic compound, e.g. an alkylene bisphenol in which the alkylene group contains up to 4 carbon atoms and each phenolic ring is substituted with up to four alkyl groups each of which contains up to 6 carbon atoms. A typical example is 2,2'-methylene bis-(4-tertiary butyl-6methyl phenol) or a monocyclic alkyl phenol containing up to 4 alkyl groups on the ring each of which contains up to 6 carbon at ms, an example of which is di-tertiary butyl methyl phenol. Stabilizer may be used in an amount of from 0.01 to 5.0 per cent based on the weight of the polymer.

The filaments and films resulting from the aforesaid process are especially advantageous as precursors for the preparation of corresponding articles having an open-celled structure with minute cells, e.g. cells smaller than those which can be measured by an optical microscope and having apparent densities significantly lower than the apparent densities of the corresponding precursor, e.g. filaments and films having no open-celled or other voidy structure.

As used herein, the term "apparent density" signifies the weight per unit of "gross volume" of the filament or film, where "gross volume" is the product of the measured length of the weighed filament or film and the average cross-sectional area of the fibers as calculated on the basis of measurements made with an optical microscope.

As used herein, the term "open-celled structure" signifies that the major portion of the void or pore space of the structure within the geometric confines of the filament or film is accessible to the outside geometric surfaces of said filament or film.

In accordance with this embodiment, the precursor material is subjected to a stretching operation in order to form the voids in the low density product. The stretching of said precursor may be carried out at any temperature below the melting point of the product-forming polymer. The stretching operation may be effected in a conventional manner. Thus, the stretching may be conducted by passing the precursor material through a hot medium conventionally employed in the art of stretching, such as hot air, hot water or pressured steam, preferably at a temperature between 90° C. and 140° C. During the passage through the hot medium a high stretching ratio is preferred, e.g. usually the precursor material is stretched from 0.5 to 10 times their original length. As mentioned, it is during this stretching stage that the open-celled structure, i.e. the voids present in the product is formed.

If desired, the thus-stretched product may be subjected to a heat setting or annealing step when in a stretched state. This step is generally most effective at a temperature between about 100° C. and the melting point of the fiber. The period for heat setting should be longer than about 0.1 second and may be within the range of from about 0.5 second to about 30 minutes, preferably about 2 seconds to 15 minutes. The stretching and heat setting operations may be carried sequentially or they may be combined into a single operation, e.g. by stretching the low density article over a metal surface heated to the required temperature.

The heat setting or annealing step referred to may be carried out, for example, in an oven heated to the appropriate temperature. Alternatively, the heat setting may be applied in a continuous run of the film or bundle of filaments. Such heat treatment may be by means of hot fluid, e.g. in a jacketed tube or shroud, by infra-red rays, by dielectric heating or by direct contact of the running film or filament bundle with a heated metal surface, preferably curved to make good contact. For heat setting fibers in the stretched state, such fibers may be stretched on a conventional draw frame and rewound on a bobbin and subjected to heat setting in that manner or the material may be stretched and heat set in a continuous fashion by means of two sets of driven rolls traveling at different speed with the filamentary material between the rolls passing through heated tube or over a heated metal surface.

The filaments and films resulting from the stretching operation, in a tensionless state, have apparent densities lower than the densities of the polymer materials from which they are formed, usually no greater than 855, preferably about 50 to 75 percent of the densities of the corresponding polymer materials. The sizes of the passageways to the void or pore spaces of the open-celled structure accessible to the outside of the fiber are under 5,000 angstrom units, e.g. 150 to 5,000 angstrom units, as porosimetrically determined by mercury penetration which measurement also determines the volume of such void or pore space. While the filaments and films thus obtained have void or pore spaces distributed throughout the same, as mentioned, yet they have mechanical properties comparable with those of conventional polyalkylene sulfide filaments and films, i.e. products of conventional densities. Thus, for example, the fibers with such voids of this invention can have a strength of 1–8g/denier and an elongation of 20–100 percent. The final crystallinity of these low density products is at least 30 percent, more preferably at least 40 percent and most preferably at least 60 percent, e.g. 50–100 percent.

Since the filaments and films in this embodiment of the invention contain numberless voids, they satisfactorily absorb various dyestuffs such as azoic or naphtha dyes, dispersed dyes, oil dyes, metallized dyes, vat dyes, sulfur dyes, basic dyes, mordantable dyes, and the like, so that they are readily dyed deeply and uniformly. Furthermore, the open-celled products can uniformly and sufficiently absorb other treating agents such as polymerizable compounds, e.g. vinyl monomers, heat-stabilizers, light-stabilizers, antistatic agents, and the like. Various other treating agents such as surfactants, softeners, flame resistors, etc. are also satisfactorily absorbed by the novel fibers of the embodiment of the invention.

The filaments and films spun from polymers of alkylene sulfides in accordance with the invention may be utilized for a variety of possible applications, for example, fibers or filaments having substantially low apparent densities than those heretofore obtained would be extremely useful in products requiring a high degree of insulation from heat or cold, fiberfill applications requiring a high degree of insulation, e.g. in sleeping bags and quilts, and as a general insulation material. Moreover, synthetic products of particularly low apparent density have the economic advantage that they may be often used for the same purposes as products of conventional density but with the employment of a much lower weight of material.

The unstretched or precursor fibers or filaments spun from polymers of alkylene sulfides may also be utilized in a variety of applications. For example, they may be drawn and used as continuous filament yarns or they may be drawn and cut into short lengths and further processed as staple fiber in which form they may be processed on conventional textile machinery, either alone or mixed with other natural or synthetic fibers. Staple fibers may be utilized for producing filling materials of high bulk. It is an essential part of the staple fiber process that a wavy or crimped form should be imparted to the fibers to assist their processing on conventional textile machinery, especially when mixed with natural fibers having this wavy or crimped form. The crimping of the fibers also imparts softness and bulk to yarns produced from them, leading to greater warmth in fabrics produced from such yarns.

The process of crimping the fibers has heretofore been and additional false-twisting step included after the drawing step in staple fiber production. Filaments spun from polymers of alkylene sulfides may also be utilized as textured or bulk filament yarns, but advantageously, without the requirement of the additional step, i.e. false-twisting step, required by conventional methods.

Surprisingly, it has been found that by conducting the spinning process in such a way that the draw down ratio is adjusted to a ratio of more than 1,200:1 and, to between 1,500:1 and 3,000:1 and that the fiber-forming polymer has an inherent viscosity between about 0.5 and 1.5 and higher, that on relaxation of the spun yarn, it will spontaneously take up a helical form.

Thus, in accordance with this embodiment of the present invention, a process is provided for the preparation of polyalkylene sulfides filaments or staple fibers cut therefrom, having a helically crimped form and characterized in that the crimped form is spontaneously developed by spinning the filaments of polyalkylene sulfide at a high winding speed from a polymer which provides the necessary inherent viscosity. Preferably, in this embodiment, melt temperatures of from 220° to 270° C. are employed.

The following examples further illustrate the invention:

EXAMPLE I

In these examples, a sample of polyethylene sulfide was utilized having the characteristics set forth in Table II:

TABLE II

CHARACTERISTICS OF POLYETHYLENE SULFIDE POLYMER

| | |
|---|---|
| Crystalline Melting Point, °C | |
| In Air | 208 |
| In Air | 202–205 |
| In Dow Corning Silicone 550 Fluid | 203–207 |
| Birefringence on Cooling, °C. | 185–180 |
| Elemental Analysis, % | (Theoretical) |
| 53.1   S | 53.3 |
| 39.9   C | 40.0 |
| 6.6    H | 6.6 |
| Density, g/cm at 25°C | 1.28 |
| I.V. (98/2 p-chlorophenol/ α-pinene at 120°C) | 0.97 |
| $K_D 230$ | 0.01 |
| Stabilizer-Antioxidant | A hindered phenol |
| Polymerization catalyst system | A product reaction of zinc-diethyl on water. |

In order to a polymer for melt spinning, a polymer sample which originally was in tensile bar form, was pulverized and then thoroughly dried in a vacuum oven at 90° C. and at a pressure of 100 microm for several hours prior to rod formation. Despite appropriate cooling conditions an I.V. loss was encountered in the pulverizing operation, i.e. pulverized powder I.V. was 0.86. Rods were prepared by compression (4000 psig) at 100° C. followed by a 30 minute holding cycle at 150° C.

The densified polymer was extruded on a micromelt constant pressure extruder activated by a hydraulic air cylinder.

Drawdown values were determined from the ratio of the spinnerette orifice area to the cross-sectional area of the monofilament as measured by its denier.

In the classification of spinnerettes, the L/D ratio refers to the length and diameter of the capillary. The countersink angle for the spinnerettes utilized was 60°.

Drawing results were obtained with a hot shoe draw frame.

Table III illustrates a series of runs employing the aforesaid technique. Table III further illustrates that polymer fiber properties improved with increased take-up speeds (drawdown) at a given throughput rate.

EXAMPLE II

In this Example a spinning run was effected with a polyethylene sulfide polymer in order to illustrate the spinning instability (associated with poor tensile property development) which can be primarily attributed to the low inherent viscosity (I.V.) values of the polymer and evidences the necessity of employing a polymer with a high I.V.

TABLE IV

MICRO-MELT SPINNING OF POLYETHYLENE SULFIDE POLYMERS

Spinneret: L/D-1.3, 14 mils Diameter

| Run No. | Polymer I.V. | Spinning Temp., °C. | Take-Up Speed, m/min | Tensile Properties Denier | Elong., % | Tenacity g/d |
|---|---|---|---|---|---|---|
| 1 | 0.18 | 218 | 1135 | 1.9 | 2 | 0.2 |

EXAMPLE III

This example compares polyethylene sulfide fiber tensile and elastic properties with some "hard stretch" fibers, viz. a "hard stretch" polypropylene and a "hard stretch" acetal polymer. Tables V and VI evidence the similarity in behavior of the various polymers.

TABLE V

TENSILE AND ELASTIC PROPERTIES

Comparison of Polyethylene Sulfide to "Hard Stretch" Fibers.

Test temperature and Conditions-23°C, Dry Elastic Properties

| Fiber | tensile properties | | | work mod., g/d | recovery,% extension | | permanent set extension | |
|---|---|---|---|---|---|---|---|---|
| | Denier | elong., % | ten., g/d | | 5% | 10% | 5% | 10% |
| Polyethylene Sulfide | | | | | | | | |
| Sample 1 | 1.3 | 113 | 1.2 | 16 | 90 | 62 | 7 | 13 |
| Sample 2 | 1.4 | 116 | 0.9 | 17 | 73 | 59 | 11 | 14 |
| Sample 3 | 4.6 | 0.7 | | | 71 | 48 | 6 | 13 |
| Sample 4 | 1.5 | 136 | 1.2 | 18 | 66 | 52 | 7 | 13 |
| "Hard Stretch" Polypropylene* | 7.7 | 200 | 1.5 | 25 | 50 | 46 | 4 | 5 |
| "Hard Stretch" Acetal polymer** | 4.0 | 250 | 1.3 | 25 | 45 | 31 | 6 | 12 |

*Average Values
**Average Values

TABLE VI

ELASTIC PROPERTIES

Comparison of Polyethylene Sulfide to "Hard Stretch" Fibers (Strain Rate of 100%/minute).

| Fiber | Work Reco- | Perma- nent | Modulus, g/d |
|---|---|---|---|

TABLE III.—SPINNING EVALUATION OF POLYETHYLENE SULFIDE
Pulverized Sample I.V.: 0.86

| Run number | Spinneret dimensions L/D, ratio | Diameter, mils | Spinning temp., °C. | Take-up speed range, m./min. | Tensile property range Denier | Elong., percent | Tenacity, g./d. | Fiber I.V., range |
|---|---|---|---|---|---|---|---|---|
| 1a | 10 | 20 | 230 | 1,000–2,200 | 1.0–2.3 | 70–130 | 0.8–1.3 | 0.4–0.5 |
| 1b | | | 230 | 450 | 4.6 | 15 | 0.7 | 0.4 |
| 1c | | | 220 | 800–2,200 | 0.9–1.9 | 60–120 | 0.7–1.1 | 0.6 |
| 2 | 1.3 | 14 | 220 | 30 | 50–60 | | 0.5.2 | 0.5–0.6 |
| 3a | 15 | 20 | 220 | 100–800 | 1.3–3.6 | 60–230 | 0.7–1.2 | 0.7 |
| 3b | | | 210 | 600–800 | 1.5–2.1 | 40–170 | 0.8–1.1 | 0.7 |
| 3c | | | 210 | 25–370 | 3.1–20 | 9–50 | 0.6 | 0.6–0.8 |
| 4 | 15 | 20 | ¹ 210 | 22 | 60 | 6 | 0.5 | 0.7 |

¹ Initial extrusion preceded by a ½ hour residence time at 210° C.

| Fiber | condition | denier | very, % | set, % | 0.50 g/d | 1st cycle | 2nd cycle |
|---|---|---|---|---|---|---|---|
| Polyethylene Sulphide No. 1 | As-Is | 1.7 | 23.4 | 19.3 | 0.88 | 18 | 6 |
| | boiled-off | 1.5 | 27.0 | 13.9 | 0.91 | 20 | 8 |
| Polyethylene Sulphide No. 2 | As-Is | 2.1 | 20.6 | 23.3 | 0.96 | 17 | 7 |
| | boiled-off | 2.2 | 23.8 | 17.6 | 0.84 | 18 | 7 |
| "Hard Stretch" Polypropylene * | As-Is | | 35–40 | 1–3 | 0.9–1.4 | | |
| "Hard Stretch" Acetal polymer** | As-Is | | 17–25 | 7–15 | 0.6–1.1 | | |

*Range of Elastic Properties
**Range of Elastic Properties

EXAMPLE IV

In this example two polyethylene sulfide fiber samples (corresponding to Run Nos. 3a and 3b of Table III) were extended in the manner hereinbefore described and the resulting volume ratio was noted. The volume ratio is the ratio of the fiber volume at a given extension to its volume at zero extension. These were calculated from fiber diameters determined microscopically at the different extension levels. The resulting data is presented in graphical form in FIG. I which is incorporated herein by reference.

The graph illustrates the phenomena that if a polyethylene sulfide fiber, spun in accordance with this invention is subjected to a degree of stretch below its breaking point, the ratio of the total gross volume of the stretched fiber to that of the unstretched fiber is significantly greater than one. This is very surprising and totally unexpected since the ratio of total gross volume of a given mass of a fiber of an elastic material such as rubber or spandex in the stretched state to that of the fiber in the unstretched state has been found to be suBstantially one, i.e. there is no increase of total gross volume of these fibers when they are stretched. Moreover when a conventional fiber, e.g. of nylon, polyester of polypropylene, is inelastically stretched, i.e. "cold drawn", for the purpose of increasing of the fiber, the ratio of total gross volume of stretched to unstretched material is often less than one, i.e. the apparent density of the stretched fiber is higher than that of the unstretched fiber. Expressed another way, the diameter of an elastic fiber of rubber or spandex, or of an ordinary inelastic fiber which is stretched to increase orientation, decreases on stretch to the extent that the length of the fiber increases so that the total gross volume of the stretched fiber is approximately equal to or less than that of the unstretched fiber. This is in contrast to what occurs when an elastic crystalline polyethylene sulfide fiber contemplated by this invention is stretched. The decrease in the diameter of such a fiber on stretch is either zero or very small and such a decrease in diameter does not make up for the length increase on stretch, so that the total gross volume of the stretched fiber is substantially higher than that of the unstretched fiber. As the total gross volume of the fiber being stretched increases, its apparent density decreases proportionately.

Moreover, if the stretching tension on the relatively crystalline elastic fibers as described in the preceding paragraph is released, the gross volumes and apparent densities of the fibers tend to revert back substantially to those of the fibers in the unstretched state. That is to say, the gross volume increase and apparent density decrease are reversible. However, it has been found that, if these fibers are heat treated properly in the stretched state, they may be stabilized so as to maintain their high gross volume and low apparent density characteristics after the stretching tension is removed.

The values of tenacity, breaking elongation and modulus referred to above are determined in a conventional manner with the use of an Instron Tensile Tester operating at a strain rate of 60 percent/min. The "initial" modulus, as the term is used above, is determined by measuring the slope of stress-strain curve at the point indicated by 1 percent strain.

The values of elastic recovery given above, unless otherwise noted, are determined with the Instron at a strain rate of 10 percent/minute. After the yarn is extended to the desired strain value, the jaws oF the Instron are reversed at the same speed until the distance between them is the same as at the start of the test, i.e., the original gauge length. The jaws are again reversed after two minutes and are stopped as soon as the stress begins to increase from the zero point. The elastic recovery is then calculated as follows:

$$\text{Elastic recovery} = \frac{\begin{pmatrix}\text{Total length}\\\text{when extended}\end{pmatrix} - \begin{pmatrix}\text{Final distance}\\\text{between jaws}\end{pmatrix}}{\text{Length added when extended}} \times 100$$

Measurements with the Instron at room temperature 25° C. are carried out in air at 65 percent relative humidity.

The values of melting point of a polymer as given above are crystalline melting points, i.e. temperatures at which all crystallites in a polymer disappear as indicated by loss of birefringence when the polymer is examined with a polarizing microscope.

The term "porosimetrically determined by mercury penetration" means that the open-celled nature of the structure and the approximate size of the passageways to the surface of the pores or voids making up such structure are determined with a porosimeter as described in an article by R.G. Quynn in the Textile Research Journal, vol. 33. pages 21 et seq. (1963).

It is to be understood that the foregoing detailed description is given merely by way of illustration and that many variations may be made therein without departing from the spirit of the invention.

The embodiments of the invention in which an exclusive property or privilege is claimed are defined as follows:

1. A hard stretch shaped article formed from a polymer of alkylene sulfide, said polymer having an inherent viscosity greater than about 0.5 wherein the general formula for said alkylene sulfide polymer may be represented:

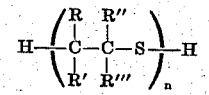

where R, R', R" and R''' are hydrogen, an aliphatic radical, a cycloaliphatic radical and an aryl radical and n is the number of monomer units in the chain such article being characterized that when subjected to a degree of stretch below its breaking point, the ratio of the total gross volume of the stretched article to that of the unstretched article is greater than one.

2. The hard stretch shaped article of claim 1 wherein said polymer is polyethylene sulfide.

3. A shaped article formed from a polymer of alkylene sulfide, said polymer having an inherent viscosity greater than about 0.5 wherein the general formula for said alkylene sulfide polymer may be represented:

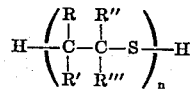

where R, R', R", and R''' are hydrogen, an aliphatic radical, a cycloaliphatic radical and an aryl radical and n is the number of monomer units in the chain and said shaped article has an open-celled structure in which the entrance passageways of the cells are no larger than about 5,000 angstroms as porosimetrically determined by mercury penetration and an apparent density lower than the density of said polymeric material from which the article is formed.

4. The shaped article of claim 3 wherein said polymer is polyethylene sulfide.

5. A crimped filament formed from a polymer of alkylene sulfide, said polymer having an inherent viscosity greater than about 0.5 wherein the general formula for alkylene sulfide polymer may be represented

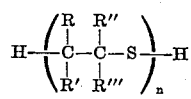

where R, R', R'', R''' are hydrogen, an aliphatic radical, a cycloaliphatic radical and an aryl radical and n is the number of monomer units in the chain.

6. The crimped filament of claim 5 wherein said polymer is a polyalkylene sulfide having an inherent viscosity from about 0.5 to 1.5.

7. The crimped filament of claim 5 wherein said polymer is polyethylene sulfide.

8. A polyethylene sulfide fiber having an open-celled structure in which the entrance passageways of the cells are no larger than about 5000 angstroms as poronimetrically determined by mercury penetration and an apparent density no greater than about 0.8 grams per cubic centimeter.

* * * * *

UNITED STATES PATENT OFFICE
CERTIFICATE OF CORRECTION

Patent No. 3,668,060          Dated June 6, 1972

Inventor(s) Walter J. Polestak

It is certified that error appears in the above-identified patent and that said Letters Patent are hereby corrected as shown below:

Column 1, line 23, delete "these" and insert --greater--.

Column 3, line 16, delete "at ms" and insert --atoms--.

Column 3, line 56, delete "when" and insert -- while--.

Column 4, line 10, delete "855" and insert --35%--.

Column 5, lines 65 to 75, in Table III, delete the three columns of data under Tensile property range and insert therefore --

| Denier | Elong., percent | Tenacity, g./d. |
|---|---|---|
| 1.0-2.3 | 70-130 | 0.8-1.3 |
| 4.6 | 15 | 0.7 |
| 0.9-1.9 | 80-120 | 0.7-1.1 |
| 50-60 | 6 | 0.5 |
| 1.3-4.6 | 100-230 | 0.7-1.2 |
| 1.5-2.1 | 140-170 | 0.8-1.1 |
| 3.1-20 | 9-50 | 0.6 |
| 60 | 6 | 0.5 |

--

Column 6, line 36, in Table V, before "and" delete "e".

Column 6, line 44, in Table V, delete "0.7" and insert --216--.

Column 6, line 44, in Table V, under column ten., q/d insert --0.7--.

UNITED STATES PATENT OFFICE
CERTIFICATE OF CORRECTION

Patent No. 3,668,060      Dated June 6, 1972

Inventor(s) Walter J. Polestak      Page - 2

It is certified that error appears in the above-identified patent and that said Letters Patent are hereby corrected as shown below:

Column 7, line 28, after "graph" insert --of Figure I--

Column 7, line 39, delete "of" at second occurrence and insert --or--

Signed and sealed this 5th day of December 1972.

(SEAL)
Attest:

EDWARD M. FLETCHER, JR.
Attesting Officer

ROBERT GOTTSCHALK
Commissioner of Patents